Nov. 9, 1937.  R. A. GOEPFRICH  2,098,657
BRAKE
Filed Dec. 21, 1935

INVENTOR.
RUDOLPH A. GOEPFRICH
BY
ATTORNEY

Patented Nov. 9, 1937

2,098,657

UNITED STATES PATENT OFFICE 2,098,657

BRAKE

Rudolph A. Goepfrich, South Bend, Ind., assignor to Bendix Products Corporation, South Bend, Ind., a corporation of Indiana Application December 21, 1935, Serial No. 55,527

4 Claims. (Cl. 188—78)

This invention relates to brakes, and is illustrated as embodied in an internal expanding automobile brake of the shiftable-anchorage type. An object of the invention is to provide a simple mechanical operating mechanism, preferably of a type which can be actuated alternatively either by the service connections or the emergency connections.

In one desirable arrangement, a floating lever arranged to act on the ends of the shoes or equivalent friction means, and which is arranged adjacent the anchor in the type of brake illustrated, is actuated to apply the brake by a lever extending generally at right angles through the backing plate, and which acts on the floating lever at one end and has a cable or other operating means connected to its other end. Preferably the floating lever moves in the space between the backing plate and the brake shoes.

In the arrangement illustrated the floating lever extends past the anchor, and is operatively engaged by an auxiliary lever (shown as fulcrumed on the brake anchor) operated by a cable or the like extending through the backing plate. In this arrangement one cable forms part of the service connections and the other forms part of the emergency connections.

The above and other objects and features of the invention, including various novel combinations of parts and desirable particular constructions, will be apparent from the following description of the illustrative embodiment shown in the accompanying drawing, in which.

Figures 1, 2, 3:
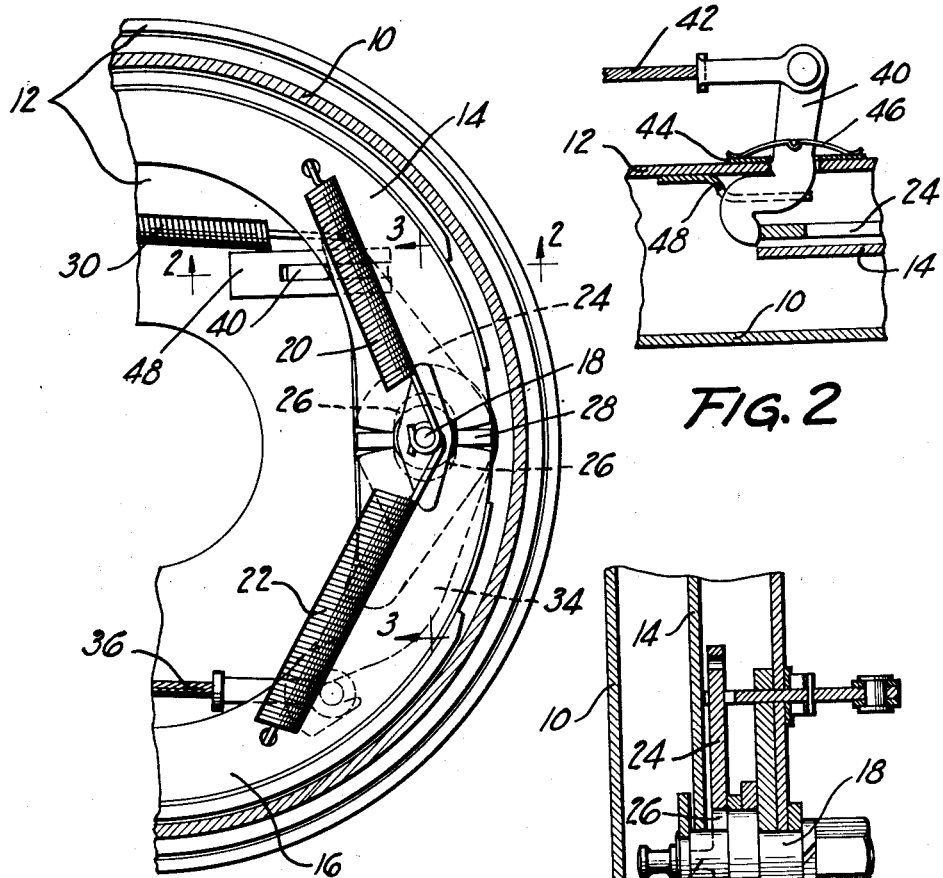
Figure 1 is a partial vertical section through a brake embodying my invention, just inside the head of the brake drum, and showing parts of the shoes in side elevation.
Figure 2 is a partial section on the line 2—2 of Figure 1, showing the mounting of the lever passing through the backing plate.
Figure 3 is a partial section vertically through all three levers, on the line 3—3 of Figure 1.

The brake selected for illustration includes a rotatable drum 10, at the open side of which is a support such as a backing plate 12, the drum and support forming a substantially closed brake chamber which houses the brake friction means, shown as T-section shoes 14 and 16. The backing plate 12 also carries an anchorage such as an anchor or post 18 between the ends of the shoes.

The return springs of the brake, indicated at 20 and 22, may be tensioned between the shoes respectively and the anchor 18. I prefer to make the spring 22, connected to the secondary shoe, stronger than the spring 20, connected to the primary shoe.

The present invention relates to the means for applying the brake, whether or not the brake is constructed exactly as shown.

As illustrated, the shoes are applied by prying them apart by means of a floating lever 24, swinging in the space between the backing plate and the shoes, and which is formed with a slot 26 encircling the anchor 18 and equal in width to the diameter of the anchor, so that the lever can float circumferentially of the brake without interference from the anchor. The lever 24 has thrust means such as lugs 28 between and in thrust engagement with the ends of the shoes on opposite sides of the anchor 18. The lever 26 may be provided with a return spring 30 tensioned between the lever and the backing plate.

The portion of the lever 24 below the anchor 18 is shown as provided with a lateral integral lug 32 engaged by the edge of an auxiliary lever 34 fulcrumed on the anchor 18. The lever 34 also swings in the space between the backing plate and the shoes, and has attached to its ends operating means such as a cable 36 extending outwardly through the backing plate.

The cable 36 may pass exteriorly of the brake through a flexible Bowden-type conduit (not shown) secured at its opposite ends to the backing plate and to the vehicle frame. Cable 36 forms part of the service connections for the brakes.

According to an important feature of the present invention, the lever 24 may also be actuated by a lever 40 passing through and fulcrumed in a slot in the backing plate and arranged generally perpendicular to the backing plate. One end of the lever 40 is rounded and is in direct thrust engagement with the portion of the lever 24 above the anchor. The other end of the lever 40 has attached thereto operating means such as a cable 42, which may form part of the emergency brake operating connections.

The slot through which the lever 40 passes is shown covered by a plate 44 carried by the lever. A bowed leaf spring 46 is shown engaging the backing plate at its ends and acting resiliently outward at its center on a pin carried by the lever 40, to hold the offset inner end of the lever against the inner face of the backing plate when the brake is not applied, and when the brake is applied to hold against the edge of the slot in the backing plate the notch formed by the two parts of the lever.

A stamping 48 spot-welded to the inner face of the backing plate has its free end slotted to embrace and guide the lever 48.

While one illustrative embodiment has been described in detail, it is not my intention to limit the scope of the invention to that particular embodiment, or otherwise than by the terms of the appended claims.

I claim:

1. A brake comprising a backing plate having friction means mounted thereon and provided with an anchor between the ends of the friction means, an operating lever formed and arranged to float relatively to said anchor circumferentially of the brake and having thrust parts acting on said ends and having portions extending on opposite sides of said anchor, a second lever mounted on the anchor and having a part in thrust engagement with one of the portions of the operating lever and having actuating means extending through the backing plate, and an auxiliary lever extending through the backing plate and having one end acting on the other of said portions and having actuating means connected to its other end.

2. A brake comprising a backing plate having friction means mounted thereon and provided with an anchor between the ends of the friction means, an operating lever movable in the space between the backing plate and the friction means and formed and arranged to float relatively to said anchor circumferentially of the brake and having thrust parts acting on said ends and having portions extending on opposite sides of said anchor, a second lever mounted on the anchor and also movable in the space between the backing plate and the friction means and having a part in thrust engagement with one of the portions of the operating lever and having actuating means extending through the backing plate, and an auxiliary lever extending through and generally at right angles to the backing plate and having one end acting on the other of said portions and having actuating means connected to its other end.

3. A brake comprising a backing plate having friction means mounted thereon and provided with an anchor adjacent the ends of the friction means, a lever between the backing plate and the friction means having parts engaging said ends adjacent the anchor, an actuating lever also arranged between the backing plate and the friction means and arranged to operate the first lever and which is provided with an operating connection extending through the backing plate, and an auxiliary lever passing through and generally at right angles to the backing plate and having one end operatively arranged to actuate said first lever and having operating means connected to its other end, said first lever and said actuating lever being coaxially pivoted for movement about said anchor.

4. A brake comprising a backing plate having friction means mounted thereon having separable ends, a floating applying device between the backing plate and the friction means having parts engaging said ends, an actuating lever between the backing plate and the friction means arranged to operate the applying device, and an auxiliary lever passing through and generally at right angles to the backing plate and having one end operatively arranged to actuate said floating applying device and having operating means connected to its other end, said applying device and said actuating lever both being fulcrumed between said ends.

RUDOLPH A. GOEPFRICH.